A. E. DOBBS.
HEADLIGHT FOR VEHICLES.
APPLICATION FILED APR. 28, 1909.
929,197.
Patented July 27, 1909.
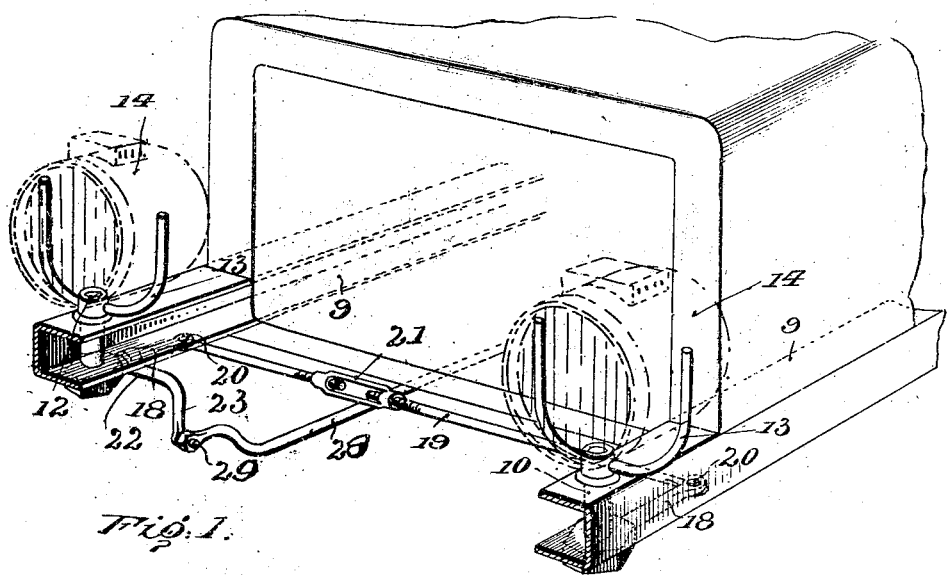
Fig. 1.
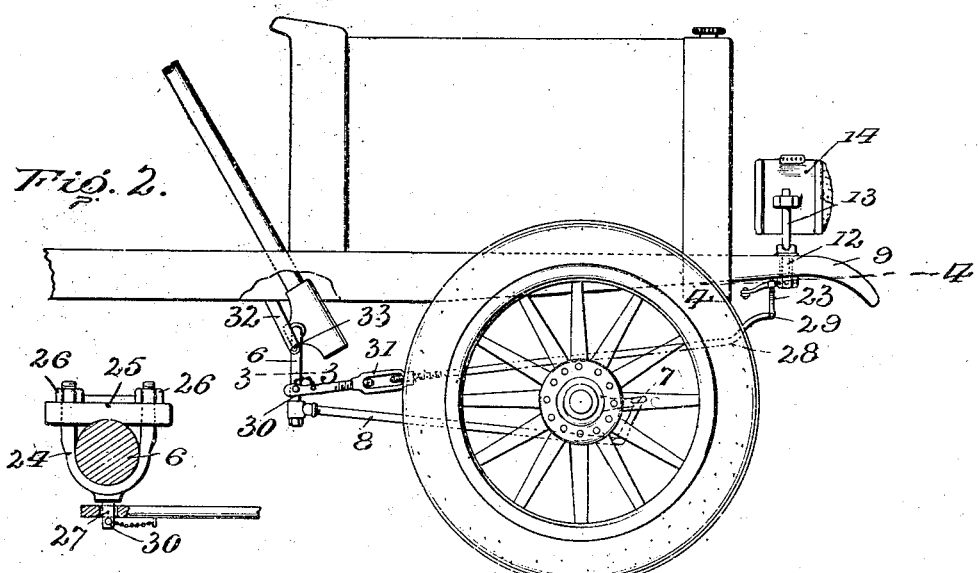
Fig. 2.
Fig. 3.
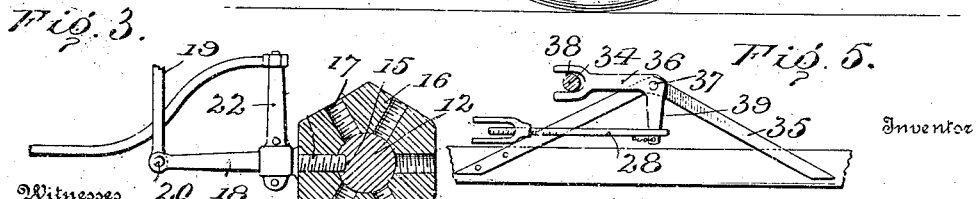
Fig. 5.
Witnesses
Fig. 4.
Inventor
A. E. Dobbs
By Dudley, Browne & Phelps
Attorney

UNITED STATES PATENT OFFICE.

ARTHUR E. DOBBS, OF WINONA, MINNESOTA.

HEADLIGHT FOR VEHICLES.

No. 929,197.　　　　Specification of Letters Patent.　　　Patented July 27, 1909.

Application filed April 28, 1909. Serial No. 492,658.

*To all whom it may concern:*

Be it known that I, ARTHUR E. DOBBS, a citizen of the United States, residing at Winona, in the county of Winona and State of Minnesota, have invented certain new and useful Improvements in Headlights for Vehicles, of which the following is a specification.

My invention relates to certain new and useful improvements in means for changing the position of the headlights on vehicles through the operation of the steering-gear of said vehicles, and the object of my invention is to provide a novel means whereby the movement of the steering-gear will communicate motion to the head-lights of the vehicle to cause them to rotate in relation to the frame of the vehicle and in accordance with the movements of the steering-wheels of the vehicle, whereby the lamps will be caused to throw their rays in the direction in which the vehicle is to travel.

A further object of my invention is to produce a construction of the character stated which will possess advantages of simplicity, efficiency and durability, and of a type comparatively inexpensive to manufacture.

With these and other objects in view my invention consists in certain constructions, combinations and arrangements of parts the preferred form of which will be first described in connection with the accompanying drawings, and then the invention particularly pointed out in the appended claims.

Referring to the drawings wherein the same part is designated by the same reference numeral wherever it occurs, Figure 1 is a perspective view of the front portion of an automobile showing the same provided with headlights mounted in accordance with my invention, the front portion of the frame of the chassis being cut away in section to more clearly disclose the construction; Fig. 2 is a side view of the front portion of an automobile provided with my preferred form of construction; Fig. 3 is a detailed sectional view taken on line 3, 3 of Fig. 2; Fig. 4 is a detailed section taken on line 4, 4 of Fig. 2, looking downward, and Fig. 5 is a detailed view of the preferred form of construction when a different type of steering mechanism is used from that shown in Figs. 1 to 3 inclusive.

6 indicates the steering-arm of an automobile or the like which is of any ordinary or desired construction, and is shown as connected to the turning levers 7 of the wheels by the bar 8 in the well known manner.

In the form of construction shown in Figs. 1 to 3 inclusive the arm 6 swings in the arc of a circle toward and away from the front wheels to turn the wheels as required.

9, 9 designate the side bars of the chassis, which are of any ordinary or desired construction, and for the sake of illustration are shown as being formed of U-shaped iron commonly employed. In the front portion of these side bars 9 I mount a bushing 10 through which passes a lamp support 12 having a forked head 13 in which the lamp 14 is mounted. Preferably, and as shown, the lower end of the lamp support 12 is screw-threaded and provided on its rear side with a slot 15.

16 is a nut preferably provided with a plurality of radial tapped openings 17, extending through the same, and 18 is an arm threaded at one end, said threaded end being adapted to be secured in the tapped opening 17 of the nut 16. By this construction it will be seen that the nut can be turned up on the lower end of the lamp support as tight as may be desired, and then by screwing the arm 18 into the radial opening 17, which is in alinement with the slot 15, the end of the arm will enter said slot and lock the nut firmly in position on the lower end of the lamp support 12.

From the above described construction it will be understood that an arm 18 projects rearwardly from each of the lamp supports, and their rear ends are connected together by a distance rod 19 pivoted at its ends to the ends of the arms 18 by means of the pivots 20. Preferably, and as shown, the rod 19 is formed of two parts which are connected together by a turn buckle 21, whereby the length of the rod may be adjusted to bring the lamps in proper position in relation to each other, and also to adjust the rod for the differences which exist between the width of the side bars of various makes of automobiles. Secured to the arm 18 of the lamp, located on the same side with the steering device, is an arm 22 which extends out at right angles to the arm 18 and with its outer end bent down, as shown at 23. Mounted on the steering lever 6 is a yoke 24 of U-form, the ends of which are threaded, and 25 is a bar provided with openings through which the ends of the yoke 24 exend. The yoke 24 and the bar 25 surround the steering lever 6, and are clamped thereto by means of the nuts 26 on the ends of the yoke.

27 is a stud projecting from the yoke 24, and 28 is a bar pivoted at one end to the portion 23 of the arm 22 by the pivot 29, and at the other end provided with an opening adapted to freely pass over the stud 27. Preferably, and as shown, the end of the stud 27 is bored to receive a cotter pin 30, whereby the bar is held on the stud. In order to properly adjust the length of the bar 28 I preferably form the same in two parts connected together by means of a turn buckle 31.

As it is desirable not to turn the lights when they are not lighted, I connect to the side of the adjacent side bar 9 a depending arm 32 carrying at its lower end a stud 33. When it is desired to hold the lamps stationary the cotter pin 30 may be removed from the end of the stud 27, the bar 28 pulled off said stud, and then the bar placed upon the stud 33. By connecting the bar to the stud 33 the lamps will be positively held stationary and be entirely disconnected from the steering mechanism.

When it is desired to attach my construction to an automobile having a form of steering-gear in which the steering-arm or lever swings in a plane at right angles to the line of travel of the vehicle I preferably use the form of construction indicated in Fig. 5. 34 is the transversely movable steering-lever operated in any desired way. 35 is a bracket extending out from the adjacent side bar 9, and 36 is a bell crank lever pivoted at 37 to the bracket 35. One arm of this bell crank lever is provided with the forked end 38 adapted to engage the steering lever 34 while the arm 39 is formed to have the end of the bar 28 connected thereto in the same manner as the bar is connected to the stud 27 previously described.

When the parts of my device have been placed on an automobile and connected together in the manner described the length of the rod 19 and the bar 28 are adjusted by means of the turn buckles 21 and 31 to cause the lamps to be parallel to each other and also parallel with the plane of the steering wheels. When the wheels are moved by the steering lever the lamps will be correspondingly swung and will consequently be caused to throw their light in the direction in which the vehicle is being steered instead of straight ahead. By adjusting the position of the yoke 24 with the steering lever 6 the amount of turning movement of the lamps in proportion to the turning movement of the steering wheels can be readily adjusted.

I realize that considerable variation is possible in the details of construction and arrangement of parts without departing from the spirit of my invention, and I therefore do not intend to limit myself to the specific form shown and described.

Having thus described my invention what I claim as new and desire to secure by Letters Patent is:

1. The combination with the steering apparatus of a vehicle having a steering-arm, of a plurality of bushings mounted on the vehicle, a lamp-support rotatably mounted in each bushing, the lower end of each of said supports being screw-threaded and having a slot cut in one side thereof, a nut provided with radial openings threaded on each of said supports, an arm threaded in one of said openings and extending into said slot, whereby said nut is locked upon said lamp-support, a rod connecting said arms together and means connecting one of said arms with said steering-arm whereby the movement of the steering-arm will rotate said lamp-brackets.

2. The combination with the steering apparatus of a vehicle having a steering-arm, of a plurality of lamp-supports rotatably mounted upon the vehicle, means connecting said lamp-supports to cause the same to rotate in unison, a bar connected at one end to one of said lamp-supports, means for removably connecting the other end of said bar to said steering-arm, and means adjacent said steering-arm for supporting said bar when disconnected from said steering-arm.

In testimony whereof I affix my signature in presence of two witnesses.

ARTHUR E. DOBBS.

Witnesses:
D. E. TAWNEY,
MAUDE R. WHITE.